United States Patent [19]
Thirion de Briel

[11] Patent Number: 5,586,634
[45] Date of Patent: Dec. 24, 1996

[54] CLUTCH MECHANISM, ESPECIALLY FOR A MOTOR VEHICLE

[75] Inventor: Jacques Thirion de Briel, Colombes, France

[73] Assignee: Valeo, Paris, France

[21] Appl. No.: 284,487

[22] PCT Filed: Dec. 17, 1993

[86] PCT No.: PCT/FR93/01266

§ 371 Date: Sep. 8, 1994

§ 102(e) Date: Sep. 8, 1994

[87] PCT Pub. No.: WO94/13970

PCT Pub. Date: Jun. 23, 1994

[30] Foreign Application Priority Data

Dec. 17, 1992 [FR] France .................................. 92 15246

[51] Int. Cl.⁶ ................................................. F16D 13/50
[52] U.S. Cl. .................................... 192/70.27; 192/89.24
[58] Field of Search ............................... 192/70.27, 89.23, 192/89.24

[56] References Cited

U.S. PATENT DOCUMENTS 5,265,709  11/1993  Takeuchi et al. ................... 192/89 B

FOREIGN PATENT DOCUMENTS

| 0249469 | 12/1987 | European Pat. Off. . | |
| 1108632 | 6/1956 | France | 192/89.23 |
| 2001379 | 6/1969 | France . | |
| 4040592 | 6/1992 | Germany | 192/89.24 |
| 2222439 | 3/1990 | United Kingdom . | |
| 92/06312 | 4/1992 | WIPO . | |

Primary Examiner—Andrea L. Pitts
Attorney, Agent, or Firm—Longacre & White

[57] ABSTRACT

The clutch mechanism comprises a hollow cover plate (1) having at its outer periphery an annular skirt (3), at least one pressure plate (20), and a diaphragm (30), the outer periphery of which defines a Belleville ring (31), which, firstly, bears at its outer periphery on a deflection abutment (6, 60, 61, 62) carried by the cover plate (1) and, secondly, at its inner periphery it bears on a projecting element (22) of the pressure plate (20) so as to urge the plate (20) in a direction in which it is displaced away from the cover plate (1). The deflection abutment (6, 60, 61) is of resilient material and carries an integral centring extension (7, 71), oriented generally axially and interposed radially between the inner periphery of the skirt (3) of the cover plate (1) and the outer periphery of the diaphragm (30).

2 Claims, 2 Drawing Sheets

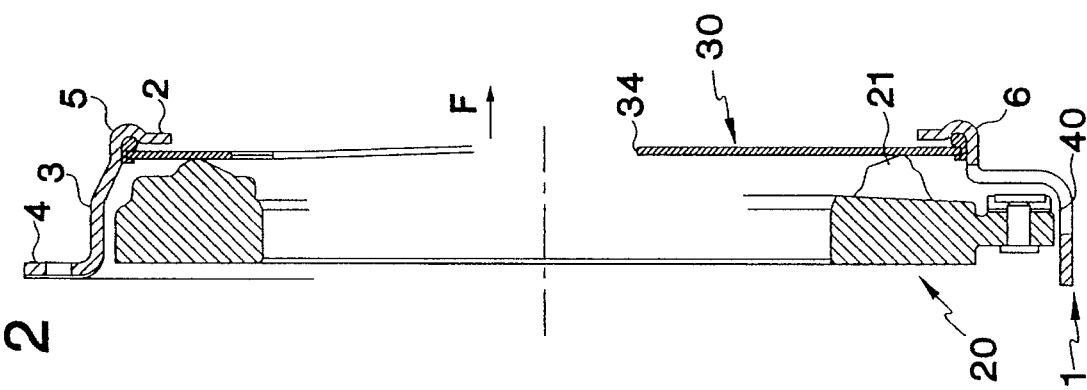
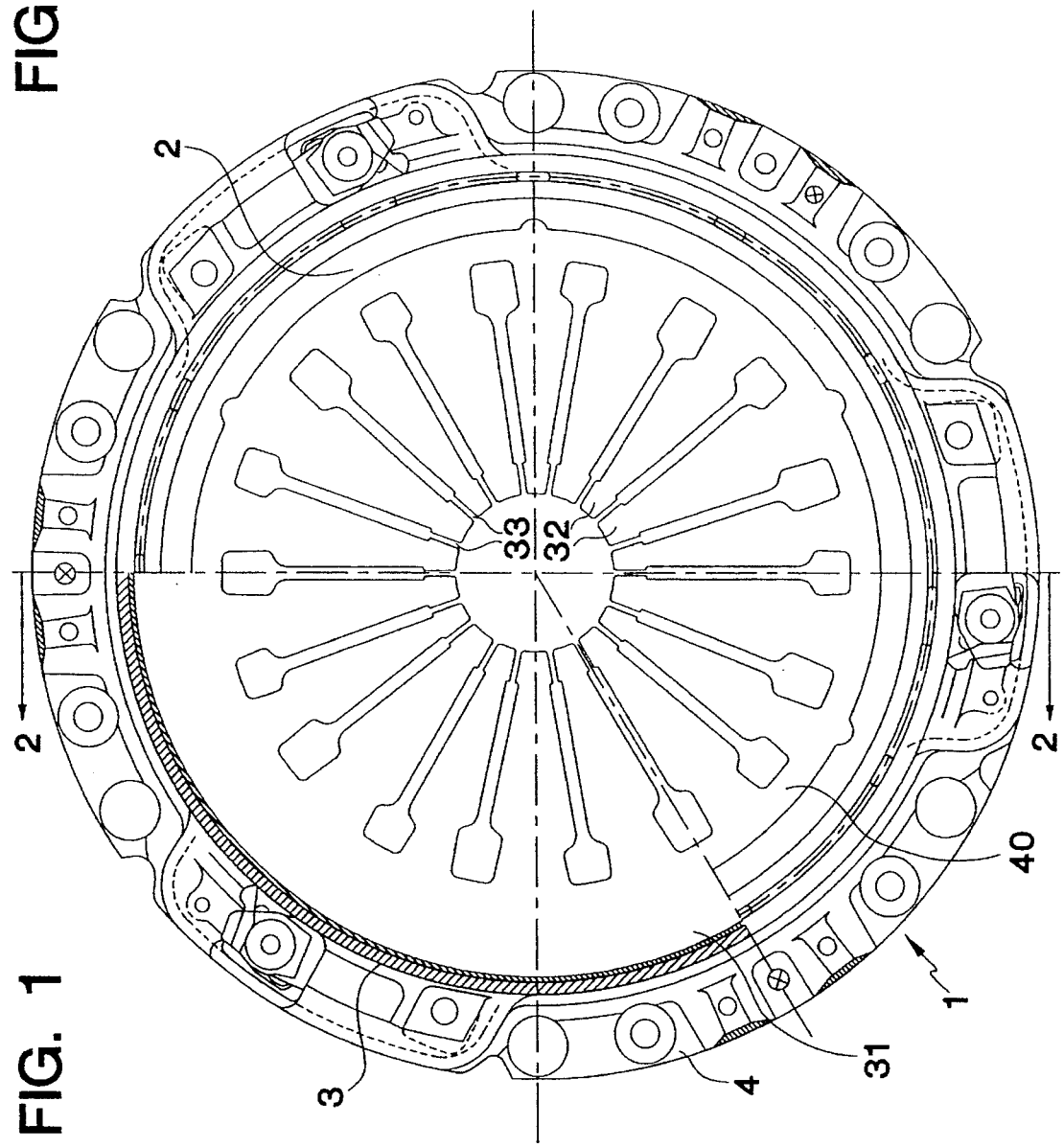

CLUTCH MECHANISM, ESPECIALLY FOR A MOTOR VEHICLE

BACKGROUND OF THE INVENTION

The present invention is concerned in general terms with diaphragm clutches, especially for motor vehicles, and is directed more particularly to that part of these clutches, commonly referred to as the clutch mechanism, which, constituting by itself a unitary assembly, is to be fitted as such on a plate, referred to as a reaction plate, after a friction plate has been inserted, so as to constitute such a clutch.

In general terms, and as described in the document FR-A-2 463 874, such a mechanism comprises a hollow cover plate having at its outer periphery an annular skirt, oriented generally axially, at least one pressure plate, which is coupled in rotation to the cover plate through attachment means which enable the said pressure plate to be displaced axially with respect to the said cover plate, and, between the cover plate and the pressure plate, a diaphragm the outer periphery of which defines a Belleville ring, which, firstly, bears at its outer periphery on a deflection abutment carried by the cover plate, and, secondly, bears at its inner periphery on a projecting element of the pressure plate so as to urge the said plate in a direction in which it is displaced away from the cover plate.

Such a mechanism poses problems. In this connection, having regard to manufacturing tolerances, the diameter of the peripheral skirt of the cover plate may vary not insignificantly, for example in the order of 1 mm for a cover plate size having a diameter of the order of 220 mm.

The same is true, to a lesser extent, for the diaphragm, since its manufacturing tolerances are of course more strict, but it is subjected to ovality effects due in particular to the heat treatment to which it is subjected so as to give it a certain hardness and elasticity. For example, the diameter of the diaphragm may vary by 0.5 mm for a cover plate size with a diameter of 220 mm.

Conventionally, the mechanism is dynamically balanced before leaving the production line, but once it is fitted in the vehicle, this mechanism is no longer able to be dynamically balanced, the diaphragm being displaced with respect to the cover plate under the effect of parasitic movements such as shocks, wear in the deflection abutment, longitudinal and radial movements of the crankshaft of the engine, etc.

SUMMARY OF THE INVENTION

An object of the present invention is to overcome these drawbacks in a simple and inexpensive way, and accordingly to provide a novel clutch mechanism which is dynamically balanced under all circumstances.

In accordance with the invention, a mechanism of the type described above is characterised in that the deflection abutment is of elastic material and carries an integral centring extension, oriented generally axially and interposed radially between the inner periphery of the skirt of the cover plate and the outer periphery of the diaphragm.

Thanks to the invention, the extension defines a resilient bearing which automatically centres the diaphragm with respect to the cover plate in the event of any relative movement of the diaphragm with respect to the cover plate.

Thus the dynamic balancing which is carried out on the production line will be preserved subsequently. In addition, the deflection abutment with its extension isolates the diaphragm with respect to the cover plate, so that the mechanism is not noisy, to the benefit of the comfort of the occupants of the vehicle.

It will also be appreciated that the deflection abutment enables wear and manufacturing tolerances, and in particular geometrical imperfections in the cover plate, to be compensated for.

In this connection, the cover plate, which is usually made by press forming, does not have perfect geometry, so that the engagement offered by the cover plate to the diaphragm is not regular, and as a result, some of the fingers of the diaphragm are offset with respect to the others.

Thus the clutch release bearing, acting on the ends of the fingers of the diaphragm, must bear first on the offset fingers and then on the others.

As a result, there is a loss of lift at the pressure plate.

Thanks to the invention, the abutment, being subjected to the action of the diaphragm, will be compressed in such a way that it will take up these geometric imperfections to the benefit of improved lift of the pressure plate. The clutch release bearing is also moved to a lesser extent, and wear is reduced in the fingers of the diaphragm.

In addition, in the context of a diaphragm clutch of the pull-off type, the deflection abutment with its extension enables rotation of the diaphragm to be prevented, in particular by friction, thus economising on the use of stop pins for preventing rotation, such as can be seen for example in FIG. 14 of the above mentioned document FR-A-2 463 874.

Preferably, the deflection abutment with its centring extension is of an elastic material capable of being reticulated, and is formed by deposition on a deposit surface associated with the cover plate and/or with the diaphragm.

Thus the abutment can be adhesively secured to the diaphragm in such a way that wear between the diaphragm and its deflection abutment is minimised.

It will be appreciated that the deflection abutment, with its integral extension in accordance with the invention, enables use to be made of a cover plate of fibre reinforced synthetic material, due to the fact that geometric imperfections are taken up by the deflection abutment, and due to the centring effect given by the extension.

In general terms, the manufacturing tolerances of the cover plate and diaphragm are able to be less precise, so that the arrangement in accordance with the invention is inexpensive. Wear is also reduced, which leads to a longer working life for the mechanism.

In addition, the said deflection abutment enables vibrations to be absorbed, especially vibrations arising from longitudinal and radial movements of the crankshaft.

In one embodiment, the cover plate is so configured that it has a toroidal seating element in which the deflection abutment, in the form of a ring-shaped annular band, is nested. Fitting of the diaphragm can then be achieved by simple axial movement. In a modification, the extension may have at its free end a transverse flange directed towards the axis of the assembly, so that the deflection abutment caps the diaphragm in the manner of a tire.

In a modification, the cover plate may be simplified and may have a flat base, due to the presence of the deflection abutment in accordance with the invention.

BRIEF DESCRIPTION OF THE DRAWINGS

The description which follows illustrates the invention with reference to the attached drawings, in which:

FIG. 1 is a view in elevation of the clutch mechanism in accordance with the invention, shown partly cut away in order to reveal the peripheral portion of the diaphragm, FIG. 2 is a view in cross section taken on the line 2—2 in FIG. 1.

DETAILED DESCRIPTION OF THE PREFERRED EMBODIMENTS

Figure 3:
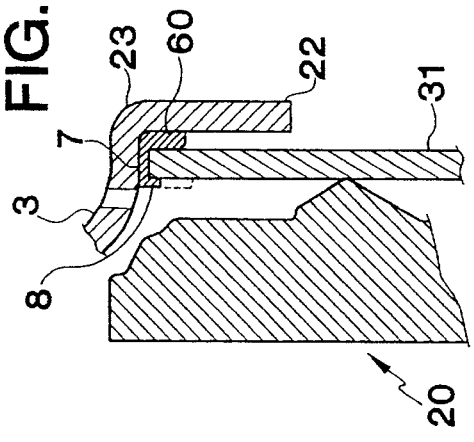
FIG. 3 is a view on a larger scale of part of FIG. 2, showing the deflection abutment and the portion of the cover plate associated with it.

In these Figures, there is shown a clutch mechanism for a motor vehicle, of the kind comprising a hollow cover plate 1 having at its outer periphery an annular skirt 3 which is oriented generally axially, at least one pressure plate 20 which is coupled in rotation to the cover plate 1 through attachment means 47 which give axial displacement of the pressure plate 20 with respect to the cover plate 1, and, between the cover plate 1 and the pressure plate 20, a diaphragm 30, the outer periphery of which defines a Belleville ring 31, which, firstly, bears at its outer periphery on a deflection abutment 6, 60, 61, 62 carried by the cover plate 1, and secondly, bears at its inner periphery on a projecting element 21 of the pressure plate 20, in order to urge the said plate 20 in a direction in which it is displaced away from the cover plate 1.

In order to have dynamic equilibrium under all circumstances, and accordingly to limit the relative displacement of the diaphragm 30 with respect to the cover plate 1, especially with respect to the peripheral skirt 3 of the latter, such a mechanism is characterised in that the deflection abutment 6, 60, 61 is of elastic material and carries an integral centring extension 7, 71, which is oriented generally axially and which is interposed radially between the inner periphery of the skirt 3 of the cover plate 1 and the outer periphery of the diaphragm 30.

More precisely, in FIGS. 1 and 2, the cover plate 1 has the form of a dished plate, with a radially oriented flange 4 extending away from the axis of the assembly, and an annular skirt 3, oriented generally axially and joining the flange 4 to the base 2 of the cover plate, which is formed with a central hole.

In this example the cover plate, through its skirt, surrounds the pressure plate 20. The latter is coupled in rotation to the cover plate through attachment means in the form of tangential tongues 47, which enable it to be displaced axially with respect to the cover plate 1 and which are directed transversely to the axis of the assembly.

In a manner known per se, and as can be seen in FIGS. 1 and 2, these tangential tongues 47 are secured at one of their ends, in this example by riveting, to a lug of the pressure plate 20, and at their other end by riveting to an offset portion of the flange 4.

All of the arrangements disclosed in the document FR-A-2 463 874 may in fact be considered, and the attachment means may consist of radial tenons of the pressure plate, each of which is engaged in an axial groove formed in the skirt 3 of the cover plate 1.

The radial flange 4 may be of another form, and may have welded spacers for connecting it with the reaction plate. The unitary mechanism may have two pressure plates and a friction plate, the friction liners of which are gripped between the two plates.

It will be recalled that the unitary clutch mechanism, constituted by the annular components comprising the cover plate 1, the pressure plate 20, and the diaphragm 30, is adapted to be carried through its cover plate 1 (in this example by the portion 4 of the latter) on the reaction plate of the clutch (not shown), for gripping, between the said pressure and reaction plates, the friction liners of a friction plate which has at its inner periphery a hub which is splined for coupling it in rotation with the input shaft of the gearbox, the reaction plate and the clutch mechanism being coupled in rotation to the crankshaft of the internal combustion engine.

In the clutch engaged position, the diaphragm 30, in engagement on the deflection abutment 6 (FIG. 2), urges the pressure plate away from the base 2, in a direction in which it is displaced away from the cover plate 1, so that the friction liners of the friction plate are gripped between the pressure plate and reaction plate.

In order to disengage the clutch, it is necessary to work in traction on the diaphragm 30, using a clutch release bearing which can be seen for example in FIG. 1 of the above mentioned document FR-A-2 463 874, in the direction of the arrow F in FIG. 2, so as to cause the diaphragm 30 to be deflected and to cause its gripping action on the plate 20 to cease, whereby to lift the plate and release the friction liners of the friction plate.

The diaphragm 30 has a frustoconical shape in the free state, and once it is fitted in the mechanism it has a shape which is initially generally flat when in the clutch engaged position. It has a peripheral portion in the form of a Belleville ring 31, from which radial fingers 32, separated from each other by slots 33, extends centrally inwards.

These slots are open into a common central aperture 34. It is by acting in traction on the free ends of the fingers of the diaphragm that the latter is caused to be deflected. The diaphragm bears through the inner periphery of its Belleville ring 31 on a projecting element 21, which in this example is divided into sectors, of the pressure plate 20, and through the inner periphery of its Belleville ring on the deflection abutment 6 carried by the cover plate 1.

In FIGS. 1 to 3, the cover plate includes a toroidal seating element 5 which defines the junction zone of the skirt 3 with the base 2 of the cover plate.

The deflection abutment, in elastic material in accordance with the invention, comprises an annular band, in this example of circular cross section, which is adapted to be fitted by insertion in the toroidal seating element 5.

The seating element 5 has a shape which is complementary to that of the ring-shaped abutment band 6.

The abutment 6 (FIG. 3) is so configured at its outer periphery that it has the axially oriented extension 7 in accordance with the invention, being in this example of constant thickness.

At its free end, this extension has a transverse flange 8 which is directed towards the axis of the assembly.

Thus, the abutment 6, with its extension 7 and its flange 8, caps the outer periphery of the diaphragm, and more precisely the outer periphery of the Belleville ring 31, in the manner of a tire.

The Belleville ring 31 is thus trapped axially between the abutment 6 proper and the flange 8.

The extension is interposed radially between the outer periphery of the ring 31 (the edge of the latter) and the inner periphery of the skirt 3.

As will have been understood, the abutment 6 is able, by virtue of its flange 8, to be fitted in advance on the Belleville ring 31, and the assembly 31, 6, 7, 8 is then inserted axially within the skirt 3 until the abutment 6, which in this example is generally in the form of an annular ring, becomes lodged in the complementary toroidal seating element 5.

It is of course possible (FIG. 4) to fit the ring 6 in advance in its toroidal seating element 5, and then to proceed with fitting the diaphragm over the extension 71 of the ring 6.

In that case, this extension 71 does not have the flange 8, and it has a chamfered free end in order to facilitate the fitting of the Belleville ring 31.

The cover plate 1 may be simplified, and may have a transversely oriented base 22 which is directed towards the axis of the assembly, the said base being joined to the skirt 3 through a rounded portion 23. In this case (FIG. 5) the deflection abutment 60, defining an annular band, has an oblong shape in cross section, and is provided with an extension 7 and a flange 8. The abutment 60 hugs the shape of the rounded portion 23 of the cover plate.

The said abutment 60 extends transversely, and has a first face which hugs the shape of the base 22 and the shape of the rounded portion 23, for contact with the said portions, together with a generally flat second face for contact with the face concerned of the Belleville ring 31. This second face has a chamfered inner end.

In this case, as in FIG. 3, the abutment 60 with its extension 7 and its flange 8 is first mounted on the Belleville ring 31, after which the whole is fitted within the skirt 3 until contact is made by the annular band 60 with the base 22 and the rounded portion 23.

Figure 5:
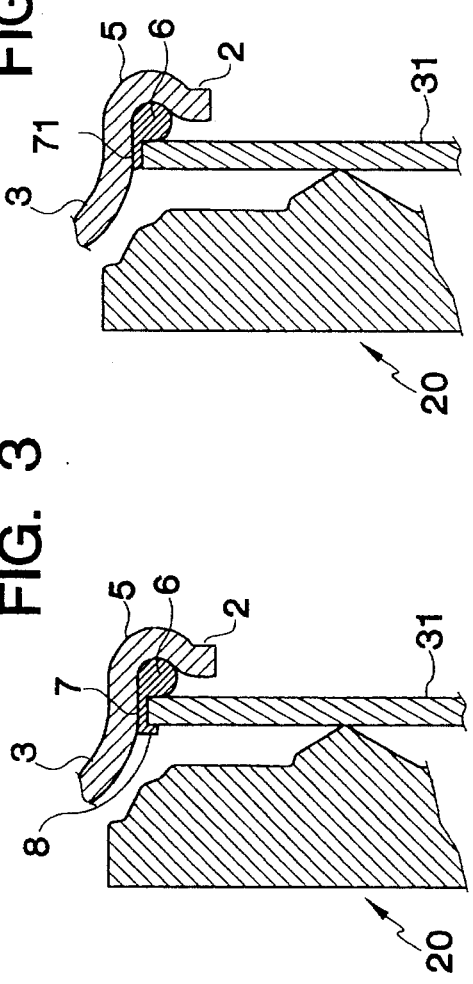
Figure 6:
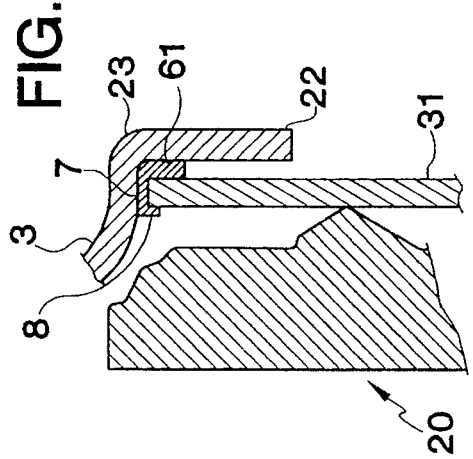

In FIG. 6, the deflection abutment 60 has the same shape as in FIG. 5, but has only an extension 7, the abutment 60 being fitted in advance in the cover plate 6. The same is true in FIG. 7, but in this case the deflection abutment 62 has a different shape, and has a rounded second face for point contact with the face concerned of the Belleville ring 31.

Figure 8:
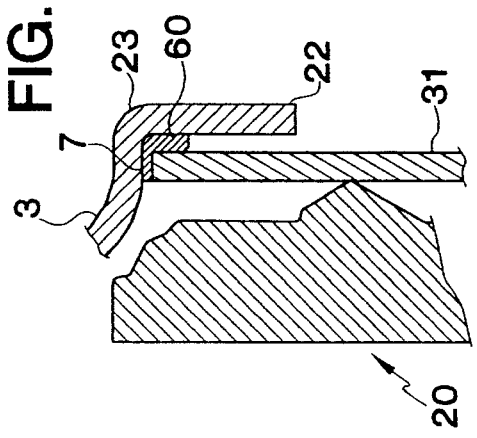

In FIG. 8, the deflection abutment 61 has an extension 7 and a flange 8 as in FIG. 5, but its second face is not chamfered.

Figure 4:
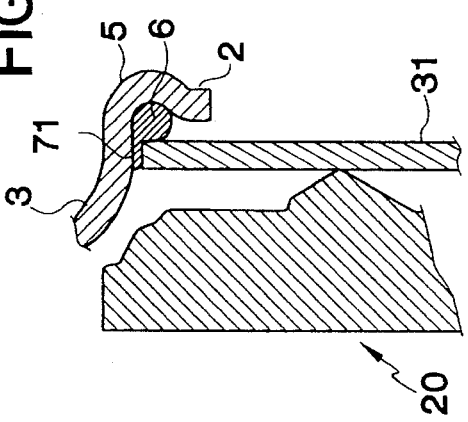
FIGS. 4 to 8 are views similar to FIG. 3 for other embodiments.
Figure 7:
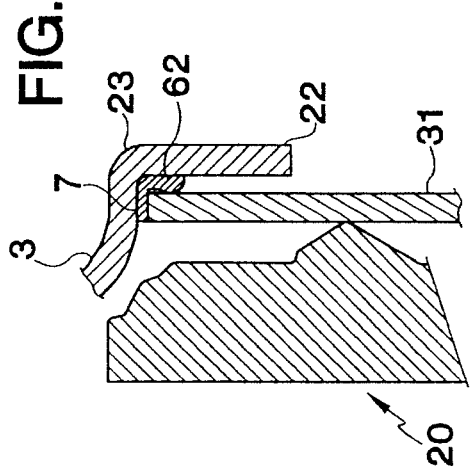

It will be noted in FIGS. 4, 6 and 7 that the annular band 6, 60, 62 may be of an elastic material capable of being reticulate (a kind of polymerization to make a tridimensional network or linkage) being formed by deposition on a deposit surface, which is preferably associated with the cover plate.

For example, this band of elastic material is for example a temperature resistant silicone paste, marketed by the company RHONE-POULENC under the Trade Mark "RHODORSEAL".

The deposition is preferably carried out using a nozzle that guarantees the thickness of the band.

In this case, the deposit surface is defined by the base 22 of the cover plate, the inner periphery of the skirt 3, and the rounded portion 23 or seating 5.

The paste thus adheres to the cover plate and also, preferably, to the diaphragm, the latter being fitted as soon as possible after deposition has been carried out.

In this way, wear in the abutment 6, 60, 62 is reduced, and contact of the diaphragm with its abutment is not noisy.

It will be appreciated that the toroidal seating 5 constitutes a mould for the ring 6. The same is true of the rounded portion 23, though to a lesser extent.

In FIGS. 3, 5 and 8, it is of course also possible to apply a deposit of paste of elastic material on the Belleville ring 31. In every case, it will be appreciated that the deflection abutment 6, 60, 61, 62, by virtue of its axial projection 7, 71, provides a rotational coupling of the diaphragm 30 with the cover plate, either by friction or by adhesion. In all cases, the flange 7, 71 defines a radial bearing which is arranged, preferably under precompression, between the Belleville ring 31 and the skirt 3, so enabling the diaphragm 30 to be centred under all circumstances. Similarly, the resilient deflection abutment 6, 60, 61, 62, compressed by the diaphragm 30, enables wear and geometrical imperfections, in the diaphragm 30 and/or in the cover plate 1, to be compensated for, and enables vibrations to be absorbed.

It will be appreciated that the precompression of the extension in accordance with the invention improves the prevention of rotation of the diaphragm.

Instead of fitting the abutment on the Belleville ring 31 in the manner of a tire, it is of course possible to apply the abutment, with its extension, in the form of a winding, using a die nozzle.

In a modification, the abutment and its integral extension may be of another temperature resistant elastic material, for example silicone based elastomer or nitryl based elastomer.

As can be seen in FIG. 5, it is of course possible to provide ventilating apertures in the skirt 3, for the purpose of evacuating heat and conserving the abutment and its extension.

It is possible to extend the flange 8 inwardly (see the broken lines in FIG. 5), so as to define inclined fins to disturb the warm air, so as to reduce the temperature in the region of the extension and its abutment. These fins are directed towards the pressure plate 20.

What is claimed is:

1. A clutch mechanism comprising a hollow cover plate having at its outer periphery an annular skirt, oriented generally axially, at least one pressure plate, which is coupled in rotation to the cover plate through attachment means which enables said pressure plate to be displaced axially with respect to said cover plate, and, between the cover plate and the pressure plate, a diaphragm the outer periphery of which defines a Belleville ring, which, firstly, bears at its outer periphery on a deflection abutment carried by the cover plate, and, secondly, bears at its inner periphery on a protecting element of the pressure plate so as to urge said plate in a direction in which it is displaced away from the cover plate, characterised in that the deflection abutment is of elastic material and carries an integral centring extension, oriented generally axially and interposed radially between the inner periphery of the skirt of the cover plate and the outer periphery of the diaphragm, characterised in that the extension is provided at its free end with a transverse flange directed towards the axis of the assembly, in such a way that the deflection abutment caps the Belleville ring of the diaphragm.

2. A mechanism according to claim 1, characterized in that the said flange (8) is extended inwardly so as to define inclined ventilating fins.

* * * * *